UNITED STATES PATENT OFFICE.

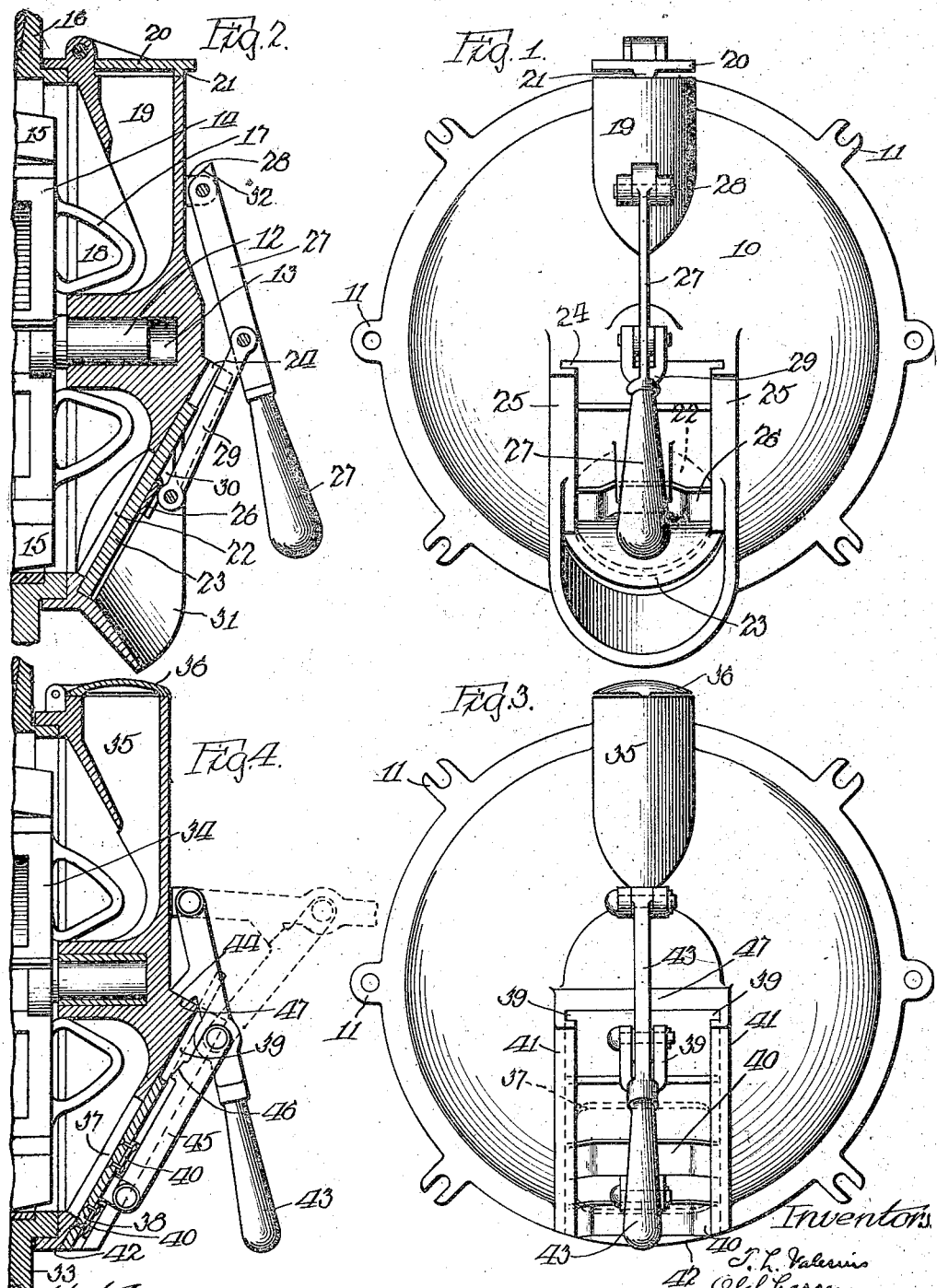

THEODORE L. VALERIUS AND OLAF LARSEN, OF FORT ATKINSON, WISCONSIN, ASSIGNORS TO THE CREAMERY PACKAGE MFG. COMPANY, OF CHICAGO, ILLINOIS, A CORPORATION OF ILLINOIS.

ICE-CREAM FREEZER.

1,425,814.   Specification of Letters Patent.   Patented Aug. 15, 1922.

Application filed June 30, 1919. Serial No. 307,822.

*To all whom it may concern:*

Be it known that we, THEODORE L. VALERIUS and OLAF LARSEN, citizens of the United States, residing at Fort Atkinson, in the county of Jefferson and State of Wisconsin, have invented certain new and useful Improvements in Ice-Cream Freezers, of which the following is a specification.

This invention relates particularly to brine ice cream freezers of the horizontal type. In machines of this type, the contents of the freezing cylinder is discharged when frozen to the consistency, approximately, of cold thick molasses, the cream being discharged into packing cans which, when filled, are placed in a hardening room. The cream is discharged from the freezing cylinder through an opening in the front head or cover of the cylinder.

One object of our invention is to provide an outlet allowing very rapid discharge of the frozen material from the freezer.

Another object is to provide a gate which will maintain a tight closure when shut and prevent leaking.

A special object is to provide an outlet which, when opened and closed again, will not present any exposed surfaces to catch the cream where it may melt and drip or fall on the floor, resulting in an unsanitary condition, an untidy appearance and waste.

This application is a continuation in part of our application Serial No. 741,626, filed January 13, 1913, and of our copending application Serial No. 167,661, filed May 10, 1917, which latter is a division of the first mentioned application.

In the accompanying drawings, Figure 1 is an end view, and Fig. 2 a vertical section of the detachable head of an ice cream freezer showing the application of our invention thereto. Fig. 3 is an end view and Fig. 4 a vertical section of a modification of the head and sliding gate shown in Figs. 1 and 2.

In the embodiment of our invention selected for illustration, 10 indicates a dome-shaped detachable head adapted to close one end of a horizontal ice cream freezer cylinder. Lugs 11 on the periphery of the head 10 are adapted to receive suitable retaining members, not shown, to hold the head in place. A centrally located shaft 12 is received in a suitable bearing 13 in the head. A rotatable spider 14 is mounted on the shaft 12 and carries inclined blades 15 adapted to agitate the cream adjacent the periphery of the freezer cylinder 16 and to move it towards the head 10. Loops 17 project into the annular recess 18 of the head to agitate the mixture lying in the recess. An air vent 19 is formed at the upper side of the head and closed by a suitable cover 20 carrying a lug 21 which spaces the cover slightly above the top of the vent to allow for the free escape of air when a batch of "mix" is introduced into the cylinder. An opening 22 in the lower portion of the head is adapted to be closed by a sliding gate 23 reciprocating in slots 24 formed in suitable enlargements 25 projecting from the dome-shaped head. A leaf spring 26 is secured at its center to the center of the gate 23 by any suitable means, such as solder or rivets, and the projecting ends of said spring are sprung into and slide in the grooves 24 carrying the gate. The spring maintains the gate at all times in close-fitting, liquid-tight engagement with the flat surface surrounding the opening 22.

Means for operating the gate are provided, comprising a hand lever 27 suitably pivoted on lugs 28 projecting from the head and carrying a pivotally connected drag link 29 connected at its lower end to lugs 30 integrally formed with or suitably attached to the gate 23. The lever 27 has an inclined face at 32 adapted to engage the face of the head and limit the opening movement of the gate. The outlet includes the downwardly inclined discharge chute 31 adapted to guide the cream falling out of the aperture 22 into a suitable receptacle, not shown.

In the modification shown in Figs. 3 and 4, we have further improved the novel outlet illustrated in Figs. 1 and 2 by the provision of improved stops to limit the motion of the gate in both directions and by eliminating the discharge chute. It has been found in practice that when cream is discharged from a device such as illustrated in Fig. 2, some cream will adhere to the discharge chute after the gate has been closed and will eventually drop onto the floor. In the device illustrated in Figs. 3 and 4, the freezing cylinder 33, agitator 34, air vent 35, and air vent cover 36 are substantially identical with those illustrated in Figs. 1 and 2. The opening 37 instead of being circular as illustrated in Figs. 1 and 2, is approximately square with rounded corners to provide a greater area of discharge opening. The gate 38 closing said opening, reciprocates in slots 39 and is held against the flat surface around the opening by two leaf springs 40 with their ends sprung into the slots 39. No chute is provided in this outlet and the metal at the lower end of the slotted guides 41 terminates horizontally at 42.

The hand lever 43 carries an angular lug 44 and the connecting link 45 carries a cooperating inclined face 46 adapted to engage the lug when the gate is in wide-open position as indicated in dotted lines and limit the opening movement of the gate. The upper end of the enlargement forming the slotted guides is shaped to form an inclined face 47 adapted to engage the angular lug 44 on downward movement of the lever and limit the closing movement of the gate. The parts are so designed that with the lug in engagement with the stop 47, the lower edge of the gate, which is cut at a bevel and will shear in two the stream of cream flowing through opening 37, comes to rest flush with the lower surface of the slotted guides. It will be seen that upon closure of the gate there is no projecting lip or other surface to which cream can adhere.

While we have disclosed in detail the embodiment of our invention at present preferred, it should be clearly understood that the detailed disclosure is for purposes of illustration only and that many modifications and improvements of the specific embodiments described will naturally occur to a person skilled in the art. We aim in the subjoined claims to cover all such legitimate modifications and improvements.

We claim as our invention,

1. An ice cream feezer having, in combination, a head, said head having an inclined portion adjacent its lower edge, said inclined portion having a discharge opening, and a sliding gate adapted to open and close said opening, the lower portion of the periphery of said opening being so located that cream may fall vertically downward therefrom without touching any other part of the freezer.

2. An ice cream freezer having, in combination, a detachable head, said head having an inclined portion adjacent its lower edge, said inclined portion having a discharge opening, a flat face on said inclined portion extending around the periphery of said opening, a sliding gate resiliently pressed against said flat face and adapted to open and close said opening, a lever and a drag link for operating said gate, and a lug on said lever adapted by engagement with said drag link to limit the upward motion of said gate, and by engagement with said head to limit the downward movement of said gate.

3. An ice cream freezer having, in combination, a head, said head having an inclined portion adjacent its lower edge, said inclined portion having a discharge opening, a flat face on said inclined portion extending around the periphery of said opening, a sliding gate adapted to open and close said opening, a lever and a drag link for opening and closing said gate, and means on said lever for limiting the downward motion of said gate.

4. An ice cream freezer having, in combination, a head, an inclined portion adjacent the lower edge of said head, said inclined portion having a discharge opening, a sliding gate adapted to close said opening, the lower edge of said sliding gate being beveled off horizontally and adapted when said gate is in fully closed position to lie flush with the lower horizontal edge of said head.

5. An ice cream freezer having, in combination, a horizontal freezer cylinder, a head closing the end of said cylinder, an inclined portion adjacent the lower edge of said head, said inclined portion having a discharge opening, a sliding gate adapted to open and close said opening, guideways for said gate, said guideways being open at their lower ends, and means for limiting the closing motion of said gate.

6. An ice cream freezer having, in combination, a dome-shaped head, said head having a discharge opening, a flat face formed on said head adjacent the periphery of said opening, said face extending in a plane inclined to the vertical, and a sliding gate resiliently pressed against said face and adapted to close said opening.

7. An ice cream freezer having, in combination a head having an opening, slotted guides adjacent said opening, a discharge gate slidable in said slotted guides and slidably engaging said head, and adapted to close said opening, and a leaf spring engaging said slotted guides and said gate and resiliently holding said gate against said head.

8. An ice cream freezer having, in combination, a head having an opening, slotted guides adjacent said opening, a gate slidable in said guides and slidably engaging said head to close said opening, and a leaf spring attached to said gate with its ends engaging said slotted guides to resiliently hold said gate against said head.

9. An ice cream freezer having, in combination, a horizontal freezing cylinder, a head closing the forward end of said cylinder, said head having an inclined portion adjacent its lower edge, said inclined portion having a discharge opening and a flat face surrounding said opening, said flat face extending to the periphery of the head, and a sliding gate adapted to cover and uncover said opening, said gate when closed extending to the periphery of the head, the lower portion of the periphery of said discharge opening being so located that cream may fall vertically downward therefrom without touching any other part of the freezer.

In testimony whereof we have hereunto set our hands.

THEODORE L. VALERIUS.
OLAF LARSEN.